United States Patent
Haq (10) Patent No.: US 9,319,254 B2
(45) Date of Patent: Apr. 19, 2016

(54) METHODS AND SYSTEMS FOR PROCESSING NETWORK MESSAGES IN AN ACCELERATED PROCESSING DEVICE

(75) Inventor: Moiz Haq, Ontario (CA)

(73) Assignee: ATI Technologies ULC, Markham (ON) (CA)

(*) Notice: Subject to any disclaimer, the term of this patent is extended or adjusted under 35 U.S.C. 154(b) by 451 days.

(21) Appl. No.: 13/566,890

(22) Filed: Aug. 3, 2012

(65) Prior Publication Data

US 2014/0037027 A1    Feb. 6, 2014

(51) Int. Cl.
*H04L 27/06* (2006.01)
*H04L 27/00* (2006.01)
*H04M 1/725* (2006.01)
*H04L 27/26* (2006.01)

(52) U.S. Cl.
CPC ....... *H04L 27/0008* (2013.01); *H04M 1/72522* (2013.01); *H04L 27/2601* (2013.01)

(58) Field of Classification Search
CPC ...................................................... H04L 49/00
USPC .......................................... 375/340; 370/469
See application file for complete search history.

(56) References Cited

U.S. PATENT DOCUMENTS

| 8,139,608 B2 | 3/2012 | Lotter et al. | |
|---|---|---|---|
| 2005/0216700 A1 | 9/2005 | Honary et al. | |
| 2011/0188391 A1 | 8/2011 | Sella et al. | |
| 2011/0302390 A1* | 12/2011 | Copeland et al. | 712/2 |
| 2012/0036016 A1 | 2/2012 | Hoffberg et al. | |
| 2012/0159039 A1* | 6/2012 | Kegel et al. | 711/6 |
| 2012/0246381 A1* | 9/2012 | Kegel et al. | 711/6 |
| 2013/0138840 A1* | 5/2013 | Kegel et al. | 710/22 |
| 2013/0145051 A1* | 6/2013 | Kegel et al. | 710/9 |
| 2013/0145055 A1* | 6/2013 | Kegel et al. | 710/26 |
| 2013/0262736 A1* | 10/2013 | Kegel et al. | 711/3 |

OTHER PUBLICATIONS

International Search Report and Written Opinion for International Application No. PCT/IB2013/002440, Canadian Intellectual Property Office, Canada, mailed on Mar. 11, 2014 (7 pages).
"Architectural Implications for Simd Processors in the Wireless Communication Domain" (Wang et al.) High Performance Computing and Communication & 2012 IEEE 9th International Conference on Embedded Software and Systems (HPCC-ICESS), 2012 IEEE 14th International Conference on, IEEE Jun. 25, 2012, pp. 1199-1204, XP032255408.
"Electrical Performance of 3D Circuits" (Heittmann et al.), in: "Handbook of 3D Integration" (Aug. 6, 2008), Wiley-VCH Verlag GmbH & Co. KGaA, Weinheim, Germany, pp. 599-621, XP055019842.
"State of the art baseband DSP platforms for Software Defined Radio: A survey", (Anjum et al.), EURASIP Journal on Nireless Communications and Networking, vol. 2011, No. 1, (Jan. 11, 2011), p. 5, XP055053153.

* cited by examiner

*Primary Examiner* — Jung Park
*Assistant Examiner* — Albert Shih
(74) *Attorney, Agent, or Firm* — Volpe and Koenig, P.C.

(57) ABSTRACT

The present method and system enables receiving a radio frequency (RF) signal. The received RF signal is assigned to a single instruction multiple data (SIMD) module in an accelerated processing device (APD) for processing to extract network messages. The extracted network layer messages are further processed by the SIMD module to obtain data transmitted via the RF signal.

14 Claims, 5 Drawing Sheets

METHODS AND SYSTEMS FOR PROCESSING NETWORK MESSAGES IN AN ACCELERATED PROCESSING DEVICE

BACKGROUND

1. Field of the Invention

The present invention is generally directed to graphics processing units (GPU), and more particularly to using graphics processing units to process network messages.

2. Background Art

Existing mobile computing systems (for example, smart phones, tablets, laptops, etc.) have multiple processors assigned to perform different tasks. For example, a central processing unit (CPU) as a central processor, a graphics processing unit (GPU) for processing computer graphics, and one or more processors to process physical layer messages. The multiple processors are used in the mobile computing systems to process messages of different types or messages intended for different applications. For example, a different processor may correspond to processing cellular signals, WiFi signals, landline communication signals, global positioning system (GPS) signals, and computer graphics signals. Multiple processors are used to process network messages such as physical layer messages because the computational capabilities of existing physical layer processors are limited. Application specific integrated circuit (ASIC) implementations are not feasible due to frequent changes in communication standards. The use of multiple network processors is expensive and inefficient, and the route from these processors to a CPU is long and slow. As data rates of computing systems increase, the route from the physical layer processors to a CPU may become a bottleneck.

SUMMARY OF THE EMBODIMENTS

What are needed are methods and systems for more efficiently processing different types of network messages.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

Embodiments of the present invention provide, under certain circumstances, methods and systems for processing aspects of network messages (e.g., the physical layer of such messages) in an accelerated processing device (APD). In one embodiment, a radio frequency (RF) signal is received by a radio frequency integrated circuit (RFIC) chip, converted to digital data, and sent to an APD. The RF signal received is assigned to a single instruction multiple data (SIMD) module for processing. In one embodiment, physical layer messages are extracted from the RF signal and processed by the SIMD module to obtain data transmitted via the RF signal.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION OF THE EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

About twenty years ago, the technology industry was divided into computer industry, telecommunications industry, electronic media industry, and others. The last decade witnessed the merger of the telecommunications industry and the computer industry. Later, the electronic media industry joined as well. Today's mobile computing systems may comprise of multiple processors on a printed circuit board (PCB) to perform computing, communication, and multimedia related tasks. Additionally, developments have allowed a computing processor and a multimedia engine to reside inside a single silicon, sharing resources and improving performance. Such technology may be also used in a way that the APD performs various networking operations such as physical layer operations, along with computing and multimedia tasks. Embodiments described below are made in reference to physical layer operations but other networking operations and operations on wired networking operations are also applicable.

Figure 1:
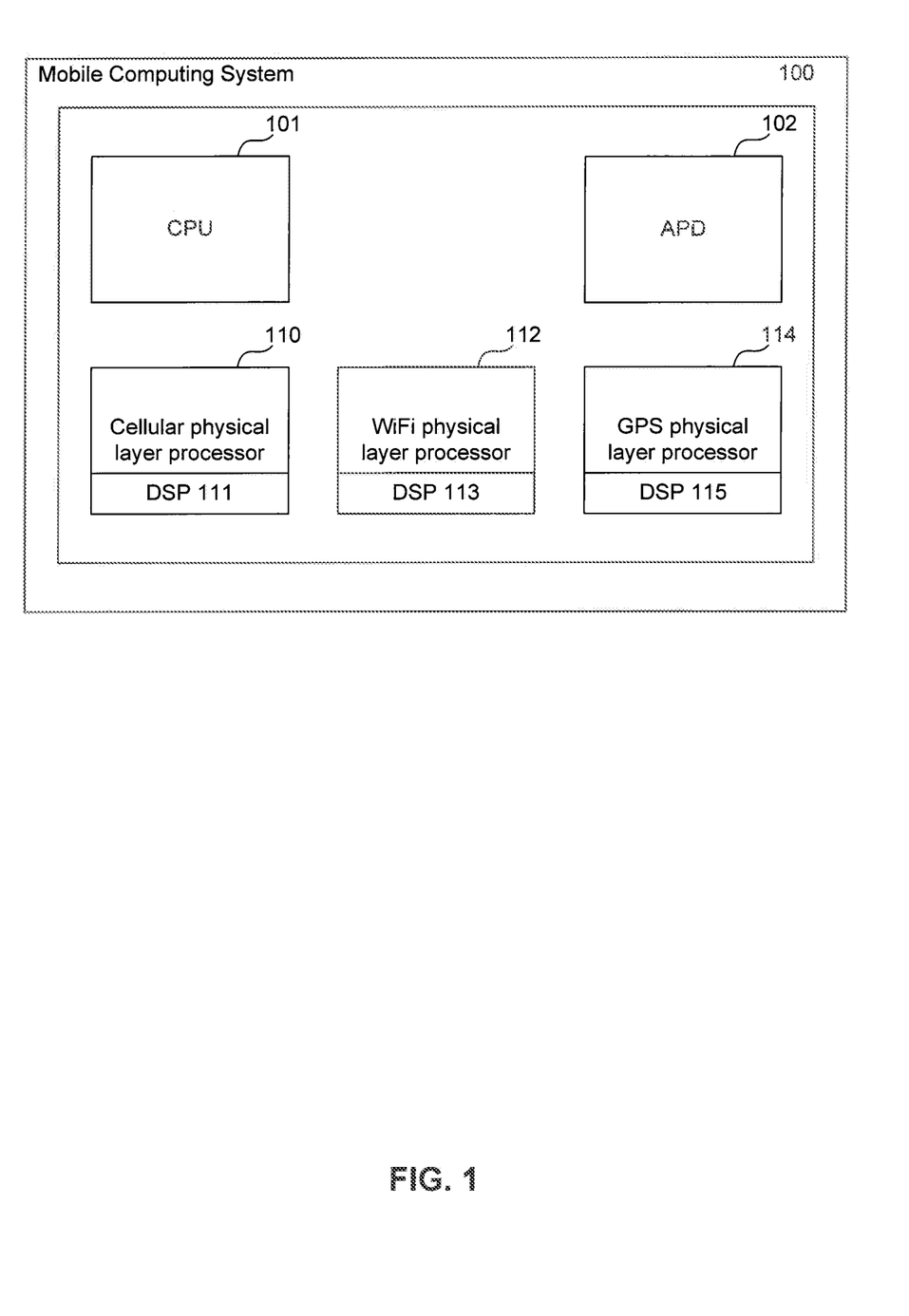
FIG. 1 is a diagram illustrating multiple physical layer processors in a mobile computing system, according to an embodiment.

FIG. 1 shows a mobile computing system 100, according to an embodiment. For example, mobile computing system 100 may include multiple processors, e.g., and without limitation, CPU 101 as a central processor, APD 102 for graphics processing, cellular physical layer processor 110 for processing cellular baseband signals (physical layer messages), WiFi physical layer processor 112 for processing WiFi physical layer messages, and a GPS baseband processor 114 for processing GPS baseband signals (physical layer messages). The number of processors to process physical layer messages in mobile computing system 100 is not limited to three physical layer message processors (for example, 110, 112, and 114) as shown in FIG. 1.

In one example, physical layer message processors are used to process cellular physical layer messages. Physical layer message processors may comprise of one or more digital signal processors (DSP). In one example, cellular baseband processor 110 may comprise of one or more DSPs 111 that process physical layer messages received by cellular baseband processor 110. In one example, time sensitive physical layer messages, such as live streaming video, may have to be processed in a certain amount of time. DSP 111 may have to operate at a higher frequency to meet such time requirements which may result in DSP 111 consuming higher amount of power, and dissipating higher amount of heat. In one example, the physical layer messages may have to be processed by DSP 111 in a serial fashion. This may result in DSP 111 spending considerable computing power and time in reading data from memory, performing required operations on the data, and then writing the processed data back to the memory.

In an exemplary wireless environment, signals may pass between base stations (not shown) and mobile computing system 100. A base station is a radio receiver/transmitter that serves as a hub of a local wireless network, and may also act as a gateway between a wired network and a wireless network. As wireless signals travel through difficult RF environments (fading or weak RF signals), base station may request mobile computing system 100 to perform certain tasks. These requests may result in mobile computing system 100 re-assigning computing resources and focusing on higher priority tasks, which can delay processing of lower priority tasks. As a result, the overall performance or quality of service (QoS) of mobile computing system 100 may be affected.

In one example, mobile computing system 100 has wireless channels dedicated to different types of traffic, e.g., control channel, voice channel, data channel, etc. Each of these channels have different processing requirements, e.g., forward error correction parameters etc. Some channels may carry time sensitive data, such as control channel information or pilot channel information. As a result, mobile computing system 100 with limited resources may have to assign significant amount of computing resources to time sensitive tasks when mobile computing system 100 is located in adverse RF conditions. As a result, the overall QoS of a mobile computing system 100 may drop to maintain the signal and give preference to time sensitive information.

Another challenge in mobile computing system 100 may be multipath propagation. Multipath propagation occurs when a RF signal takes different paths from a source to a destination. For example, a first part of the RF signal reaches the destination directly, while a second part of the RF signal bounces off an obstruction, then reaches the destination. In one example, there may be multiple versions of such delayed signals. As a result, a part of the RF signal encounters delay and travels a longer path to the destination. On the receiving end, the multipath signals may be combined, using techniques well known to a person skilled in the relevant art, to obtain a better quality signal. In one example, a transmitting party and a receiving party agree upon a code that is used to track signals. The code agreed upon between the transmitting party and the receiving party is embedded into a message that is transmitted, and the receiving party may generate the code internally. The DSPs available in physical layers processors 110, 112, 114 may be able to combine only a few delayed versions of such signals received by mobile computing system 100 due to limited number of computing resources available in the DSPs 111, 113, 115 of a physical layer message processors 110, 112, 114.

Therefore, there is a need for physical layer processors with a larger number of computing resources to process and combine a significantly higher number of delayed signals to create a better incoming signal at the receiving end to improve QoS. Additionally, there is a need for processors with high computing capabilities to process different types of physical layer messages.

Figure 2:
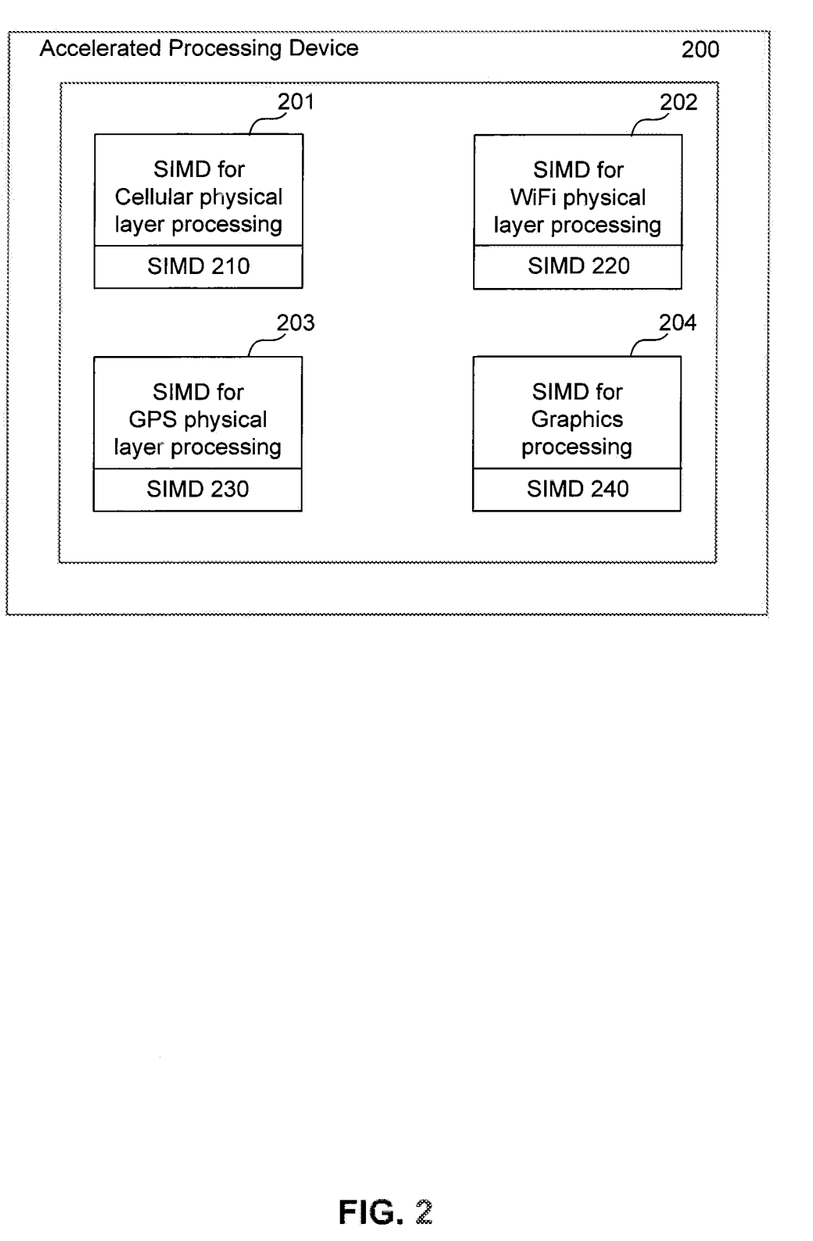
FIG. 2 is a diagram illustrating an accelerated processing device (APD) for processing different types of physical layer messages in a mobile computing system, according to an embodiment.

FIG. 2 shows a system 200, according to an embodiment of the present invention. For example, system 200 is an APD for processing different types of physical layer messages in a mobile computing system 100 described in FIG. 1. In one example, FIG. 2 illustrates APD 200 comprising single instruction multiple data (SIMD) modules, for example, SIMD modules 210, 220, 230, and 240 assigned to process different types of physical layer messages. As referred to herein, a SIMD is a pipeline, or programming model, where a kernel is executed concurrently on multiple processing elements each with its own data. All processing elements in a SIMD execute an identical set of instructions. Having one or more SIMDs, in general, can make APD 200 ideally suited for applications that may require higher processing capabilities as described above.

In on example, SIMD module 210 is assigned to process cellular physical layer messages, SIMD module 220 is assigned to process WiFi physical layer messages, SIMD module 230 is assigned to process GPS physical layer messages, and SIMD module 240 is assigned for processing computer graphics.

In an embodiment, the functionality illustrated above in FIG. 1 using multiple physical layer message processors (for example, processors 110, 112, and 114) may be implemented using APD 200 due to relatively large number of computing resources, i.e., SIMD modules, available inside APD 200. For example, the large number of computing resources available in APD 200 (relative to number of DSPs available in physical layer processors in FIG. 1) may be used to process physical layer messages relatively faster, and thus may be capable of creating a better quality signal at the receiving end by processing and combining a significantly higher number of delayed signals due to multipath propagation described above. In one example, APD 200 may assign multiple SIMD modules to process cellular physical layer messages.

In an embodiment, the number of SIMD modules assigned to process different types of physical layer messages may be static. For example, SIMD modules available in APD 200 may be allocated as follows: 30% to process cellular physical layer messages, 10% to process WiFi physical layer messages, 10% to process GPS physical layer messages, and remaining 50% to process computer graphics. In an embodiment, the number of SIMD modules assigned to process different types of physical layer messages may be dynamically determined by APD 200. It is to be appreciated that the number of SIMD modules for processing each type of message may be based on demand and dynamically assigned by APD 200.

In one example, APD 200 may execute numerous mathematical operations on signals/messages, such as simple matrix and vector operations and complex functions like sampling, interpolation, aliasing, encoding/decoding, filtering, discrete transforms, interleaving and so on. The computational resources available at the disposal of APD 200 and the independent nature of SIMD modules (for example, SIMD modules 210, 220, 230, and 240) inside APD 200 means that APD 200 may provide higher computing capabilities compared to DSP implementation described above in FIG. 1. In an example, algorithms requiring parallel processing can benefit immensely from SIMD modules in APD 200, for example, SIMD modules 210, 220, 230, and 240 inside APD 200 can perform a same operation on multiple sets of data substantially simultaneously. In one example, a SIMD can perform an operation on an entire column of a butterfly matrix instead of having to do individual calculation of every node of the matrix in a DSP implementation. For example, large butterfly algorithms like Fast Fourier Transform/(FFT) or Viterbi, well known to a person skilled in the relevant art, may be implemented in APD 200 in a robust manner to saving processing time and power.

In an embodiment, the large number of computing resources available in SIMD modules of APD 200 may be used to process different types of physical layer messages (for example, cellular, WiFi, and GPS). Additionally, the large number of computing resources available in SIMD modules of APD 200 may be used to combine multiple versions (for example, significantly higher number than DSPs) of delayed signals to create a better incoming signal at mobile computing system 200 to improve QoS at mobile computing system 200.

Figure 3:
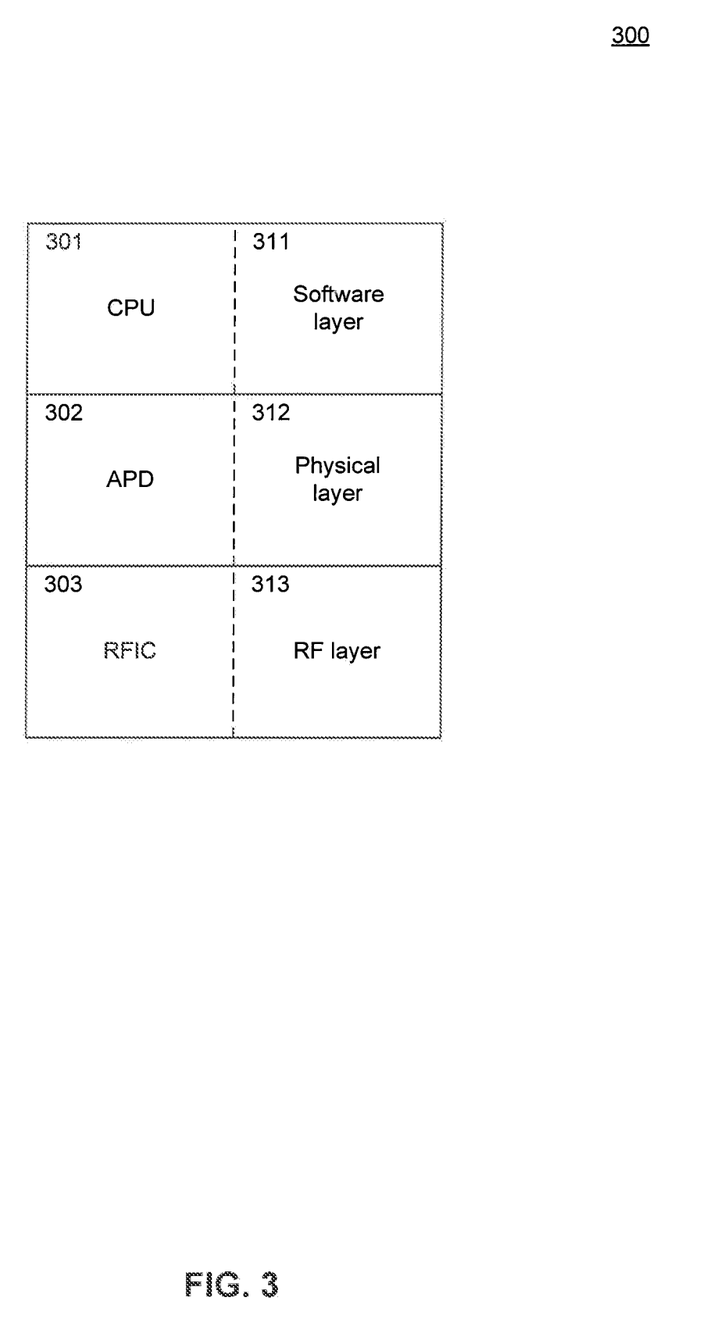
FIG. 3 is a diagram illustrating various layers in a mobile computing system, according to an embodiment.

FIG. 3 shows a system 300 with various layers, according to an embodiment of the present invention. For example, system 300 may comprise CPU 301, APD 302, and a radio frequency integrated circuit (RFIC) 303. Software layers 311 may reside in CPU 301, wireless physical layers 312 may reside in APD 302, and RF layer 313 may reside in RFIC 303. In one example, software layers 311 may comprise of application software which may be implemented on x86 core, such as a CPU 301, physical layer 312 may comprise of physical layer messages which may be implemented on APD 302, and RF layer 313 may comprise of RF messages which may be implemented on RFIC 303.

In an example, signaling between the software layers 311 and physical layer 312 may be through fast on-chip interconnects between CPU 301 and APD 302. The fast on-chip connects are discussed in detail, e.g., in FIG. 4. In an example, the connection between RFIC 303 and a SIMD module may use I and Q pairs which are continuously running, well known to a person skilled in the relevant art. CPU 301 may also control an interface to RFIC 303 to support real time requests from a base station.

In one example, wireless modems may be connected to a southbridge chip on a computer's PCB. This link on the PCB may use peripheral component interconnect express (PCIe) protocol to connect the modem to a PCIe root complex port inside the southbridge chip. The South bridge chip may send PCIe format data to a north bridge via another PCIe link on the PCB. Some systems may connect the wireless modems directly to the northbridge to improve performance. In both cases, the data is received by one of the PCIe root complex ports inside the northbridge. The PCIe format data is then converted to HyperTransport format before it reaches, through the PCB, a host CPU running an application that needs the data. This long path and conversion/de-conversion of data to different protocols to facilitate transport through the chips and PCB can become a bottleneck as data rates increase. In the proposed implementation, APD 302 and CPU 301 have a direct link to each other and system memory as shown in detail in FIG. 4 below to make the system efficient.

Figure 4:
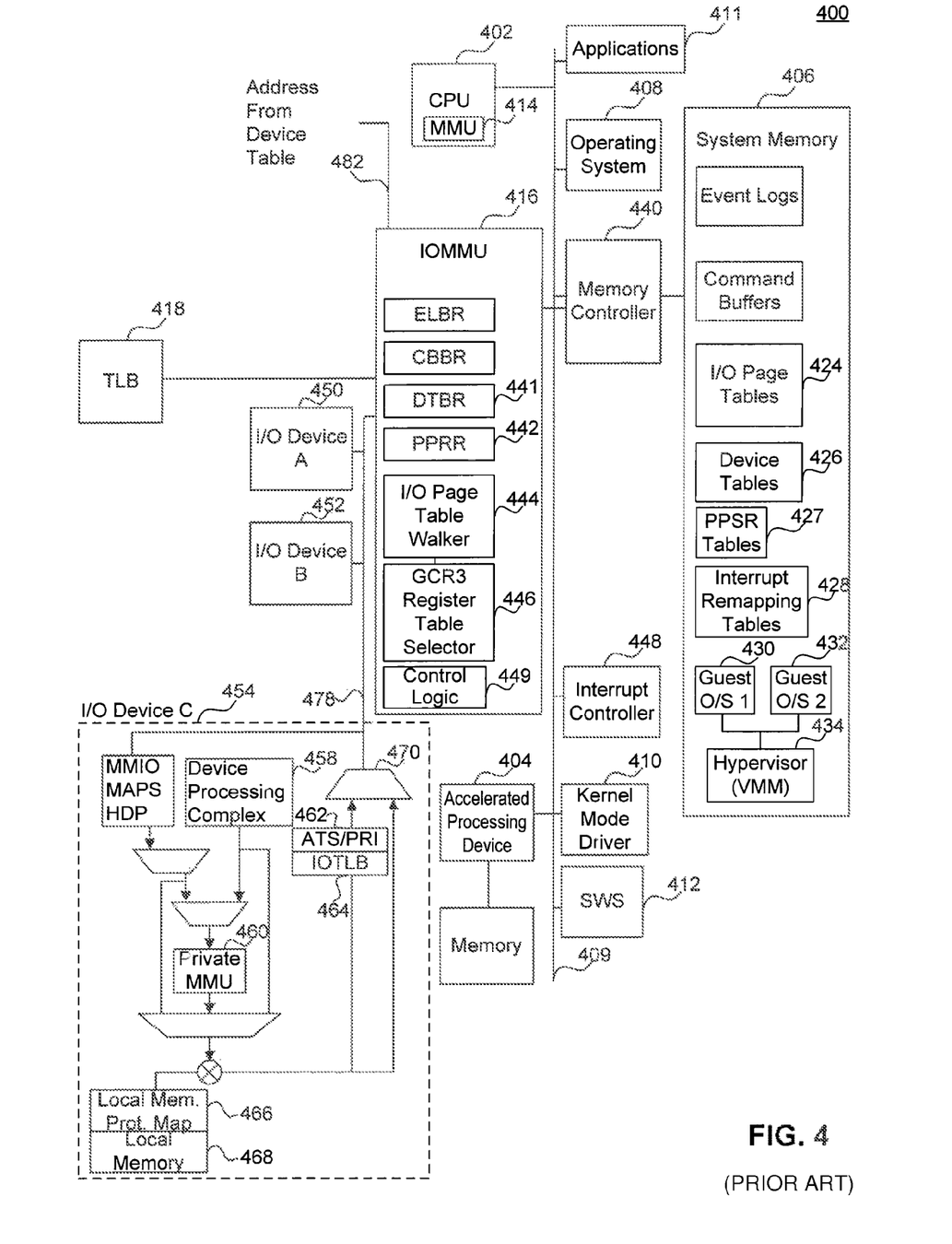
FIG. 4 is a diagram illustrating an accelerated processing device (APD), according to an embodiment.

FIG. 4 is a diagram 400 illustrating an unified computing system 400 including two processors, a CPU 402 and an APD 404. CPU 402 can include one or more single or multi core CPUs.

In one example, system 400 also includes a system memory 406, an operating system 408, and a communication infrastructure 409. Access to memory 406 can be managed by a memory controller 440, which is coupled to system memory 406. The system 400 also includes a kernel mode driver (KMD) 410, a software scheduler (SWS) 412, and a memory management unit 416, such as input/output memory management unit (IOMMU). Components of system 400 can be implemented as hardware, firmware, software, or any combination thereof.

CPU 402 can include (not shown) one or more of a control processor, field programmable gate array (FPGA), application specific integrated circuit (ASIC), or digital signal processor (DSP). CPU 402, for example, executes the control logic, including the operating system 408, KMD 410, SWS 412, and applications 411, that control the operation of computing system 400. In this illustrative embodiment, CPU 402, according to one embodiment, initiates and controls the execution of applications 411 by, for example, distributing the processing associated with that application across the CPU 402 and other processing resources, such as the APD 404.

APD 404, among other things, executes commands and programs for selected functions, such as graphics operations, processing of network messages, and other operations that may be, for example, particularly suited for parallel processing. In general, APD 404 can be frequently used for executing graphics pipeline operations, such as pixel operations, geometric computations, and rendering an image to a display. APD 404 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command or instruction. Having one or more SIMDs, in general, makes APD 404 ideally suited for execution of data-parallel tasks such as those that are common in graphics and physical layer processing. The parallel nature of SIMDs can also allow formation of delay lines and can facilitate robust implementation of convolutional interleaving/de-interleaving schemes used in DSL/VDSL physical layers.

In the example shown, communication infrastructure 409 interconnects the components of system 400 as needed. Communication infrastructure 409 includes the functionality to interconnect components including components of computing system 100. In this example, operating system (OS) 408 includes functionality to manage the hardware components of system 400 and to provide common services. In various embodiments, OS 408 can execute on CPU 402 and provide common services. These common services can include, for example, scheduling applications for execution within CPU 402, fault management, interrupt service, as well as processing the input and output of other applications.

Generally, an IOMMU can be connected to its own respective bus and I/O device(s). In FIG. 4, a communications infrastructure 409 may be any type of bus used in computer systems, including a PCI bus, an AGP bus, a PCI-E bus (which is more accurately a point-to-point interconnect), or any other type of bus or communications channel whether presently available or developed in the future. Communications infrastructure 409 may further interconnect interrupt controller 448, KMD 410, SWS 412, applications 411, and OS 408 with other components in system 400.

Alternatively, any other coherent interconnect may be used between processor 402's nodes and/or any other I/O interconnect may be used between processor nodes and the I/O devices. Furthermore, another example may include processor 402 coupled to a northbridge, which is further coupled to system memory 406 and one or more I/O interconnects, in a traditional PC design.

As illustrated in FIG. 4, the IOMMU 416 is connected between the system memory 406 and the I/O devices 450, 452, and 454. Further, the IOMMU 416 can be located on a separate chip from the system memory 406, memory controller 440, and I/O devices 450, 452, and 454. The IOMMU 416 may be designed to manage major system resources and can use I/O page tables 424 to provide permission checking, address translation on memory accessed by I/O devices, and cacheability characteristics of a page in system memory. One or more attributes of the page in the memory may define a cacheability characteristic of the page. Also, I/O page tables may be designed in the AMD64 Long format. The device tables 426 allow I/O devices to be assigned to specific domains. The device tables 426 also may be configured to include pointers to the I/O devices' page tables.

Figure 5:
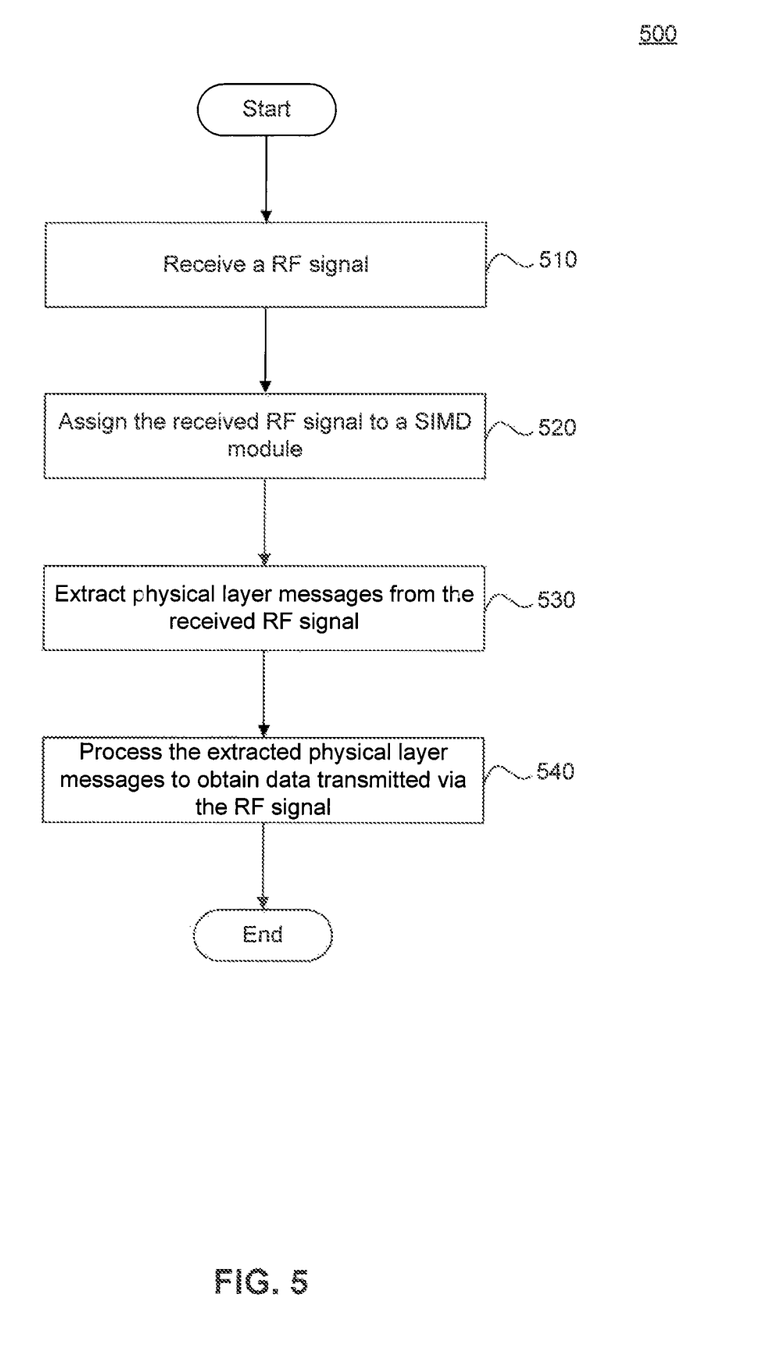
FIG. 5 is a flowchart of a method for processing physical layer messages in an accelerated processing device (APD), according to an embodiment.

FIG. 5 is a flowchart of a method 500, according to an embodiment of the present invention. For example, method 500 can be used to process physical layer messages in APD 302. In one example, method 500 can operate on one or more of the systems discussed above in FIGS. 2-4, which are referenced below for convenience, but not as a limitation. It is to be appreciated that method 500 may not be performed in the order shown, or require all of the operations shown.

At stage 510, a RF signal is received by APD 302 through RFIC 303 which removes carrier signal from the received signal, and converts the received analog signal to a digital signal. For example, APD 302 can receive the RF signal for processing from RFIC 303. The RF signal may be a cellular signal (for example, WiMAX, LTE, and LTE Advanced), a WiFi signal, a GPS signal, or the like. The RF signal may be transmitted to APD 302 from RFIC 303 via digital I and Q pairs connected to a receiver of physical layer 312. The use of I and Q pairs is well known to a person skilled in the relevant art. In an embodiment, the signal received may be a digital subscriber line (DSL) or very-high-bit rate digital subscriber line (VDSL or VHDSL) signal. In land line communications, messages are sent from a central office (CO) to a customer premise equipment (CPE) over wire. These messages are received by DSL/VDSL/VHDSL analog physical layer, converted to digital and forwarded to a SIMD for processing. For example, one of the benefits of this approach is the elimination of converting DSL messages to Ethernet messages for sending to a computer for processing.

At stage 520, the received RF signal is assigned to a SIMD module. For example, APD 302 may assign the RF signal received to SIMD module for processing. In one example, a cellular signal received may be assigned to SIMD module 210 for processing. The number of SIMD modules assigned to process the signal is not limited to one as shown in FIG. 3. APD 302 may assign SIMD modules to process the received signals based on a priority of the received RF signal. For example, if the RF signal received is associated with transfer of time sensitive data, e.g., a live streaming video on mobile computing platform 100, APD 302 may assign multiple SIMD modules to process the RF signal.

In an example, the assignment of SIMD modules by APD 302 may depend on number of antennas (not shown) on mobile computing platform 100. For example, if mobile computing platform 100 uses multiple-input and multiple-output (MIMO) configuration to improve communication performance, APD 302 may assign multiple SIMD modules to process RF signals to improve performance. MIMO configuration on mobile computing platform 100 may use multiple antennas at both transmitter and receiver of mobile computing platform 100 to improve communication performance. MIMO is one of several forms of smart antenna technology that is well known to a person skilled in the relevant art.

At stage 530, physical layer messages are extracted from the received RF For example, APD 304, via SIMD module 210, may process the received cellular RF signal and extract physical layer messages. Any method of extraction well known to a person skilled in the relevant art may be used.

At stage 540, extracted physical layer messages are processed by SIMD modules to obtain data transmitted via the RF signal. For example, APD 302, via assigned SIMD module 210, processes the physical layer messages extracted from the received RF signal to obtain data transmitted via the RF signal. Once stage 540 is complete, method 500 ends.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of processing network messages in an accelerated processing device (APD), comprising:
   receiving a radio frequency (RF) signal;
   assigning the received RF signal to a single instruction multiple data (SIMD) module in the APD for processing, wherein the APD includes a plurality of SIMD modules;
   extracting at least one physical layer message from the RF signal in an assigned SIMD module, wherein each SIMD module is assigned to process a different type of physical layer message; and
   processing the extracted at least one physical layer message in the assigned SIMD module to obtain data transmitted via the RF signal, wherein any delayed physical layer messages are combined before processing to improve signal quality and each of the SIMD modules perform parallel processing of the extracted at least one physical layer messages.

2. The method of claim 1 wherein a plurality of RF signals are received in parallel due to at least one of the RF signals being delayed due to multi-path propagation.

3. The method of claim 1, further comprising:
   tracking signals between a transmitting party and a receiving party using a code agreed upon between the transmitting party and the receiving party.

4. The method of claim 1, wherein communication between the SIMD modules in the APD and a CPU is through an on-chip inter-connect.

5. The method of claim 1, wherein the RF signal received is at least one of: a cellular signal, a WiFi signal and a global positioning (GPS) signal.

6. The method of claim 5, wherein the SIMD resources of the APD are allocated amongst the RF signal and graphics processing.

7. A computing system to process network messages comprising:
   a CPU containing a memory management unit, the CPU being connected to a software applications module, an operating system module, and an input-output memory management unit (IOMMU) module through a common infrastructure bus;
   a software scheduler circuit (SWS) connected to the infrastructure bus for accessing the software applications module;
   an interrupt controller circuit connected to the infrastructure bus;
   a memory controller circuit and an operating system circuit each connected to the infrastructure bus; wherein the memory controller circuit is also connected to the IOMMU module and to a separate system memory module;
   a plurality of input-output devices each connected to the IOMMU module for receiving an RF signal; and
   at least one accelerated processing device (APD) having a plurality of single instruction multiple data (SIMD) modules, being configured to assign the received RF signal to a SIMD module for processing, wherein the assigned SIMD module is configured to extract at least one physical layer message from the RF signal, each SIMD module being assigned to process a different type of physical layer message, and the assigned SIMD module is configured to process the extracted at least one physical layer message in the assigned SIMD module to obtain data transmitted via the RF signal, wherein any delayed physical layer messages are combined before processing to improve signal quality and each of the SIMD modules perform parallel processing of the extracted at least one physical layer messages;
   wherein the APD is connected to the infrastructure bus and to a kernel mode driver (KMD) circuit, the KMD circuit also being connected to the infrastructure bus.

8. The computing system of claim 7, wherein the RF signal is at least one of: a cellular signal, a WiFi signal and a GPS signal.

9. The computing system of claim 7, wherein the SIMD resources of the APD are allocated amongst the RF signal and graphics processing.

10. The computing system of claim 7, wherein the SIMD modules in the APD communicate with the CPU through an on-chip inter-connect.

11. A non-transitory computer readable storage device having computer program logic recorded thereon, execution of which, by a computing device, causes the computing device to perform method operations, comprising:
    receiving a radio frequency (RF) signal;
    assigning the received RF signal to a single instruction multiple data module (SIMD) module in an accelerated processing device (APD) for processing, wherein the APD includes a plurality of SIMD modules;
    extracting at least one physical layer message from the RF signal in an assigned SIMD module, wherein each SIMD module is assigned to process a different type of physical layer message; and
    processing the extracted at least one physical layer message in the assigned SIMD module to obtain data transmitted via the RF signal, wherein any delayed physical layer messages are combined before processing to improve signal quality and each of the SIMD modules perform parallel processing of the extracted at least one physical layer messages.

12. The non-transitory computer readable storage device of claim 11, wherein a plurality of RF signals are received in parallel due to at least one of the RF signals being delayed due to multi-path propagation.

13. The non-transitory computer readable storage device of claim 12, further comprising, using a code agreed between the transmitting party and the receiving party to track signals to be combined.

14. The non-transitory computer readable storage device of claim 11, wherein the RF signal received is at least one of: a cellular signal, a WiFi signal and a global positioning (GPS) signal.

* * * * *